(12) United States Patent
Ha

(10) Patent No.: US 8,866,324 B2
(45) Date of Patent: Oct. 21, 2014

(54) SYSTEM AND METHOD FOR CONTROLLING TEMPERATURE OF GEAR BOX FOR WIND POWER GENERATOR

(75) Inventor: Inchul Ha, Geoje-si (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 0 days.

(21) Appl. No.: 13/991,146

(22) PCT Filed: Jul. 29, 2011

(86) PCT No.: PCT/KR2011/005583
§ 371 (c)(1),
(2), (4) Date: May 31, 2013

(87) PCT Pub. No.: WO2012/074179
PCT Pub. Date: Jun. 7, 2012

(65) Prior Publication Data
US 2013/0257052 A1    Oct. 3, 2013

(30) Foreign Application Priority Data
Dec. 3, 2010  (KR) .......................... 10-2010-0122615

(51) Int. Cl.
*F03D 9/00*   (2006.01)
(52) U.S. Cl.
USPC .......................................... 290/44; 416/93 R
(58) Field of Classification Search
USPC ................................ 290/43, 44, 55; 416/93 R
See application file for complete search history.

(56) References Cited

U.S. PATENT DOCUMENTS

| | | | |
|---|---|---|---|
| 8,322,985 B2 * | 12/2012 | Kawai et al. ................. | 416/93 R |
| 8,362,633 B2 * | 1/2013 | Tsutsumi et al. ............... | 290/44 |
| 2009/0191060 A1 | 7/2009 | Bagepalli et al. | |
| 2010/0061853 A1 | 3/2010 | Bagepalli | |
| 2011/0204633 A1 | 8/2011 | Takayanagi | |
| 2012/0025529 A1 * | 2/2012 | Davis et al. ..................... | 290/44 |
| 2013/0287568 A1 * | 10/2013 | Miranda ........................ | 416/1 |

FOREIGN PATENT DOCUMENTS

| | | |
|---|---|---|
| JP | 2003-214325 A | 7/2003 |
| JP | 2005-240725 A | 9/2005 |
| JP | 2009-185640 A | 8/2009 |
| KR | 10-2009-0083409 A | 8/2009 |

(Continued)

OTHER PUBLICATIONS

International Search Report dated Feb. 15, 2012 of PCT/KR2011/005583 which is the parent application—2 pages.

(Continued)

*Primary Examiner* — Nicholas Ponomarenko
(74) *Attorney, Agent, or Firm* — Knobbe Martens Olson & Bear LLP

(57) ABSTRACT

Provided is a system for controlling temperature of a gear box for a wind power generator gear box. The system for controlling a temperature according to an exemplary embodiment of the present invention includes: a temperature sensor configured to measure a temperature of the gear box; a temperature adjustment unit configured to adjust the temperature of the gear box in accordance with the temperature of the gear box which is measured by the temperature sensor; a pitch adjustment unit configured to adjust a pitch angle of the blade; and a control unit configured to control the pitch adjustment unit so that the blade is rotated at a rotating speed for heating when the measured temperature of the gear box is lower than a range of a normal operating temperature of the gear box.

9 Claims, 6 Drawing Sheets

(56) References Cited

FOREIGN PATENT DOCUMENTS

| | | |
|---|---|---|
| KR | 10-2009-0116372 A | 11/2009 |
| KR | 10-2010-0086873 A | 8/2010 |
| KR | 10-2011-0120201 A | 11/2011 |

OTHER PUBLICATIONS

International Preliminary Report on Patentability dated Mar. 12, 2010 of PCT/KR2011/005583 which is the parent application—3 pages.

* cited by examiner

SYSTEM AND METHOD FOR CONTROLLING TEMPERATURE OF GEAR BOX FOR WIND POWER GENERATOR

TECHNICAL FIELD

The present invention relates to a wind power generator. More particularly, the present invention relates to a system and a method for controlling a temperature of a gear box for a wind power generator.

BACKGROUND ART

FIG. 1 is a schematic diagram of a wind power generator. Referring to FIG. 1, a wind power generator 1 includes a tower 2, a nacelle 5 formed on an upper portion of the tower 2, and a hub 4 and blades 3 rotatably formed at a front side of the nacelle 5.

Here, the nacelle 5 includes constituent elements which convert torque obtained by the blades 3 into electrical energy.

The nacelle 5 includes a main shaft 6 connected to the blades 3 and the hub 4, a gear box 8 which converts a low speed rotation of the main shaft 6 into a high speed rotation, and a generator 9 connected to the gear box 8, and the main shaft 6, the gear box 8, and the generator 9 are disposed inside a housing 7.

The gear box 8 and the generator 9 are installed and supported on a main frame 11 that is installed on an upper end portion of the tower 2.

The wind power generator having the aforementioned configuration may generate electricity when temperatures of separate components are equal to or higher than operating temperatures.

Among the components, particularly, the gear box part includes a number of gears and bearings, and therefore a lubrication system is installed in the gear box in order to prevent abrasion due to friction between the gears and the bearings.

Here, the lubrication system connected to the gear box includes a lubricant, a heating device, and a cooling device, and is formed to be able to appropriately adjust a temperature of a lubricant supplied into the gear box.

Here, an appropriate operating temperature of the gear box may mean a temperature at which viscosity of a lubricant reaches an appropriate level so that the gears and the bearings inside the gear box may be smoothly operated.

Because viscosity of a lubricant is seriously varied in accordance with a variation in temperature, the gear box is properly protected by a lubricant at a temperature equal to or higher than an appropriate temperature, but at a temperature lower than an appropriate temperature, the gears and the bearings inside the gear box may not be properly protected because of an increase in viscosity of a lubricant.

Accordingly, in a case of operating the gear box, a lubricant is allowed to be heated using the heating device in order to secure an appropriate level of viscosity of the lubricant.

However, a long period of time is needed to heat the lubricant as described above. In other to solve the aforementioned problem, a method of increasing a heating capacity of the heating device was used in the related art in order to allow the lubricant to quickly reach the appropriate temperature.

However, because a larger amount of energy should be supplied to the heating device in order to increase a heating capacity of the heating device as described above, additional energy is needed, but even though the heating capacity is increased by the additional energy, there are many cases in which the lubricant does not quickly reach the appropriate temperature.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for controlling a temperature of a gear box for a wind power generator, capable of more quickly raising a temperature of a gear box of a wind power generator.

Technical Solution

According to an aspect of the present invention, the present invention provides a system for controlling a temperature of a gear box for a wind power generator, in which the gear box connects a blade and a generator of the wind power generator, the system including: a temperature sensor configured to measure a temperature of the gear box; a temperature adjustment unit configured to adjust the temperature of the gear box in accordance with the temperature of the gear box which is measured by the temperature sensor; a pitch adjustment unit configured to adjust a pitch angle of the blade; and a control unit configured to control the pitch adjustment unit so that the blade is rotated at a rotating speed for heating when the measured temperature of the gear box is lower than a range of a normal operating temperature of the gear box.

Here, the rotating speed for heating may be a rotating speed of blade which is needed to heat the gear box to the range of the normal operating temperature of the gear box within a predetermined time.

The system for controlling a temperature of a gear box may further include a speed sensor configured to measure a rotating speed of the blade, in which the control unit may control the rotating speed of the blade, by controlling the pitch adjustment unit so as to decrease the pitch angle of the blade when the rotating speed of the blade is lower than the rotating speed for heating, and by controlling the pitch adjustment unit so as to increase the pitch angle of the blade when the rotating speed of the blade is higher than the rotating speed for heating.

The temperature adjustment unit may include a heater configured to increase the temperature of the gear box when the temperature of the gear box is lower than a heating necessary temperature that is necessary to rotate the blade in a stop state.

According to another aspect of the present invention, the present invention provides a method for controlling a temperature of a gear box for a wind power generator, in which the gear box connects a blade and a generator of the wind power generator, the method including: measuring a temperature of the gear box; and heating the gear box by rotating the blade when the temperature of the gear box is lower than the range of the normal operating temperature of the gear box.

Here, in the heating of the gear box, the blade may be rotated by controlling a pitch angle of the blade.

Here, in the heating of the gear box, a rotating speed of the blade for heating the gear box may be lower than a rotating speed for generating electricity at which the blade is rotated to produce electricity from the generator.

Here, the rotating speed of the blade for heating the gear box may be 20 to 30% of the rotating speed for generating electricity.

Here, the heating of the gear box may include: commanding a rotating speed for heating that is a rotating speed which is needed to heat the gear box within a predetermined time; measuring the rotating speed of the blade; and controlling the rotating speed of the blade by decreasing the pitch angle of the blade when the rotating speed of the blade is lower than the rotating speed for heating, and increasing the pitch angle of the blade when the rotating speed of the blade is higher than the rotating speed for heating.

Here, the method may further include, before the heating of the gear box, increasing the temperature of the gear box by using a heater connected to the gear box when the temperature of the gear box is lower than a heating necessary temperature that is necessary to rotate the blade that is stopped.

Advantageous Effects

By using the system and the method for controlling a temperature of a gear box for a wind power generator according to the exemplary embodiment of the present invention, a temperature of a gear box for a wind power generator may be raised at a much higher speed.

MODE FOR INVENTION

Figure 1:
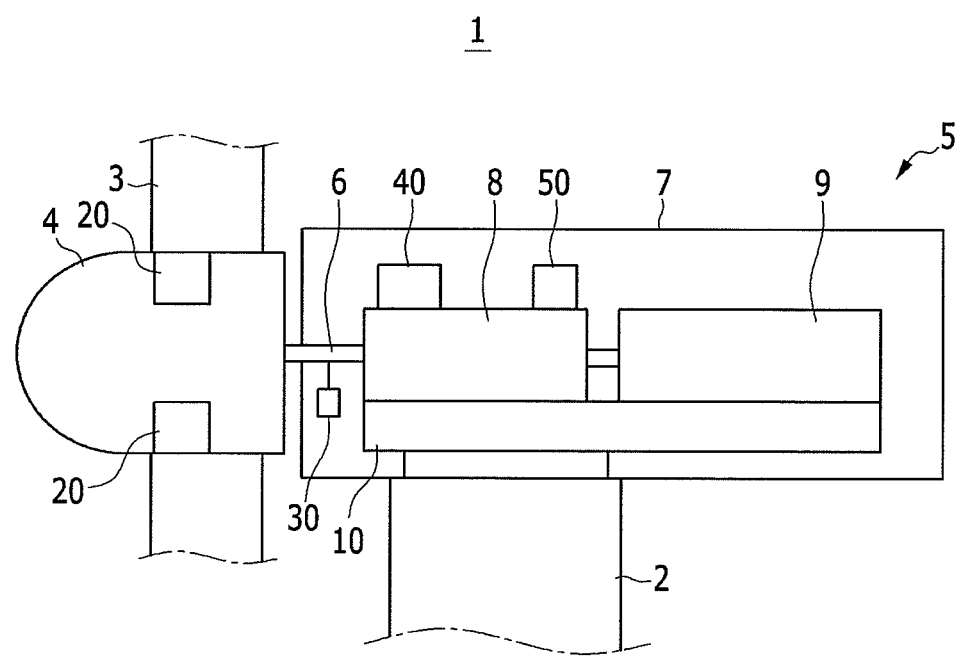
FIG. 1 is a schematic diagram of a wind power generator.

Hereinafter, an exemplary embodiment of the present invention will be described in detail with reference to the accompanying drawings so that a person skilled in the art may readily carry out the invention. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
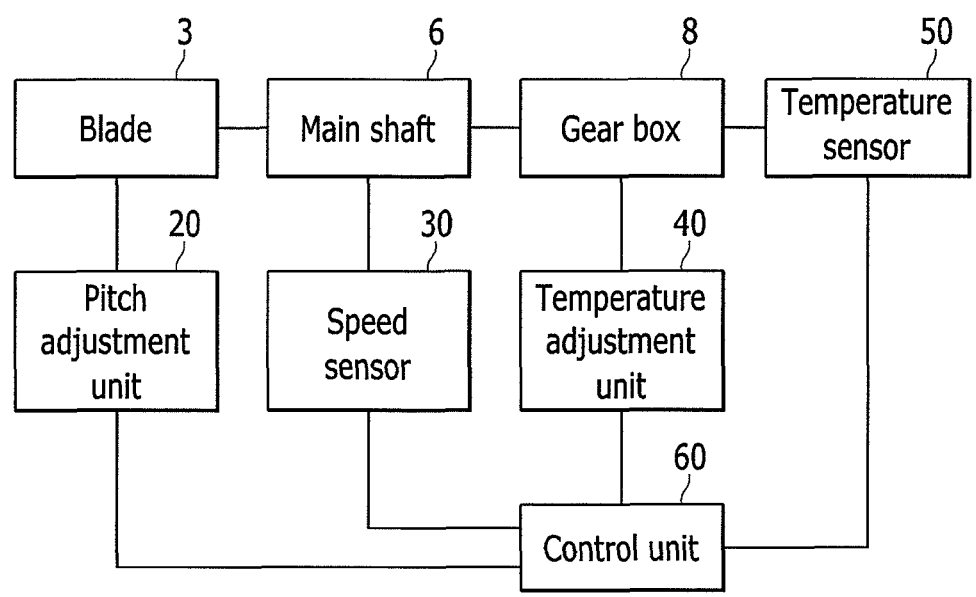
FIG. 2 is a configuration diagram of a system for controlling a temperature of a gear box for a wind power generator for performing a method for controlling a temperature of a gear box for a wind power generator according to an exemplary embodiment of the present invention.

FIG. 2 is a configuration diagram of a system 10 for controlling a temperature of a gear box for a wind power generator for performing a method for controlling a temperature of a gear box for a wind power generator according to an exemplary embodiment of the present invention.

Referring to FIG. 2, the system 10 for controlling a temperature of a gear box for a wind power generator according to an exemplary embodiment of the present invention includes a temperature adjustment unit 40, a pitch adjustment unit 20, and a control unit 60.

The temperature adjustment unit 40 is connected to a gear box 8, and may include a heater configured to raise the temperature of the gear box 8, and a cooler configured to cool the gear box 8 when the temperature of the gear box 8 becomes higher than an upper limit of a normal operating temperature.

Here, in the present exemplary embodiment, the temperature of the gear box is defined to include not only a temperature of the gear box itself but also a temperature of a lubricant that is present inside the gear box, and a meaning of adjusting the temperature of the gear box is defined to include a meaning of adjusting the temperature of the lubricant inside the gear box.

In order to adjust the temperature of the gear box 8 using the temperature adjustment unit 40, a temperature sensor 50, the temperature adjustment unit 40, and the control unit 60 are connected to the gear box 8.

The temperature sensor 50 measures the temperature of the gear box 8, the temperature of the gear box 8, which is measured by the temperature sensor 50, is transmitted to the control unit 60, which will be described below, and the temperature adjustment unit 40 is configured to adjust the temperature of the gear box 8 in accordance with a temperature adjustment signal received from the control unit 60.

The pitch adjustment unit 20 is installed in a hub connected to blades 3 and configured to be able to adjust a pitch angle of the blade 3.

The pitch means a torsion angle of the blade 3. The pitch angle of the blade 3, which is adjusted by the pitch adjustment unit 20, is 90° in an idling state in which the wind power generator does not generate electricity. Here, the blade 3 is arranged in a direction parallel to a direction in which wind blows, and an angle of attack of the blade 3 is maintained at 0°.

As such, when the pitch angle of the blade 3 is maintained at about 90°, wind just passes through the blade 3, and as a result electricity is not generated by a rotation of the blade 3 because the blade 3 is not rotated.

In order to rotate the blade 3, the pitch angle of the blade 3 needs to be maintained at 90° or lower, that is, an angle of attack needs to be maintained at 0° or higher. At a rotating speed for generating electricity, at which electricity generation may be performed by a rotation of the blade 3, the pitch angle of the blade 3 may be maintained at an angle of approximately 0°.

The pitch adjustment unit 20 according to the exemplary embodiment of the present invention is configured to adjust the pitch angle of the blade 3 by receiving a command of a value of a pitch adjustment angle from the control unit 60 in order to raise the temperature of the gear box 8 while in an idling state in which the blade 3 is not rotated.

Figure 5:
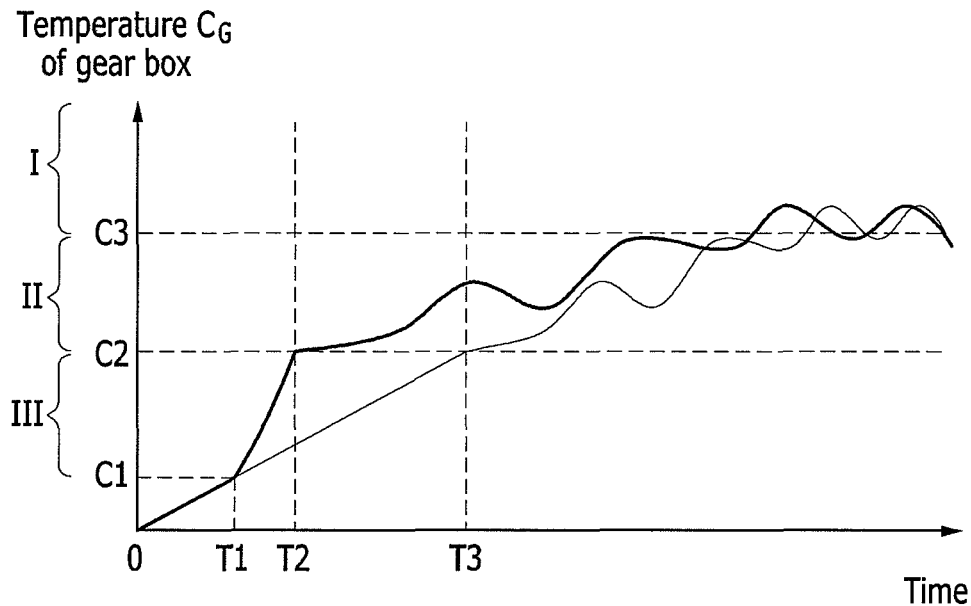
FIG. 5 is a graph illustrating a variation in temperature of a gear box in a case in which a method for adjusting a temperature of a gear box for a wind power generator according to the exemplary embodiment of the present invention is used.

In a range of a normal operating temperature (a range from a lower limit C2 of a normal operating temperature to an upper limit C3 of the normal operating temperature in FIG. 5) of the gear box 8, for example, in a case in which the temperature of the gear box 8 is lower than the lower limit C2 of the normal operating temperature, the control unit 60 controls the pitch adjustment unit 20 so that the blade 3 may be rotated at a rotating speed for heating, which is a speed lower than a rotating speed V2 for generating electricity, at which the blade 3 needs to be rotated to allow a generator 9 to produce electricity.

Meanwhile, the system 10 for controlling a temperature of a gear box for a wind power generator according to the exemplary embodiment of the present invention includes a speed sensor 30. Referring to FIG. 2, the speed sensor 30 is connected to a main shaft 6, and may measure a rotating speed of the blade 3.

Here, the speed sensor 30 is directly coupled to the main shaft 6, or positioned inside the gear box 8 to measure a rotating speed of the blade 3 while measuring a rotating speed of a gear that is rotated by the main shaft 6.

According to the exemplary embodiment of the present invention, the control unit 60 is configured to control the pitch adjustment unit 20 in accordance with the rotating speed of the blade 3, which is measured by the speed sensor 30, so as to increase or decrease the pitch angle of the blade 3.

In more detail, in order to heat the gear box in the range of the normal operating temperature of the gear box 8, that is, up to a temperature equal to or higher than the lower limit (C2 of FIG. 5) of the range of the normal operating temperature within a predetermined time (T2 of FIG. 5), the control unit 60 decreases the pitch angle of the blade when a rotating speed of the blade 3 is lower than a necessary rotating speed.

In addition, in a case in which a rotating speed of the blade is higher than a rotating speed that is needed to heat the gear box in the range of the normal operating temperature of the gear box, that is, up to a temperature equal to or higher than the lower limit (C2 of FIG. 5) of the range of the normal operating temperature within a predetermined time (T2 of FIG. 5), the control unit 60 may control a rotating speed of the blade 3 in a manner of increasing the pitch angle of the blade.

Figure 3:
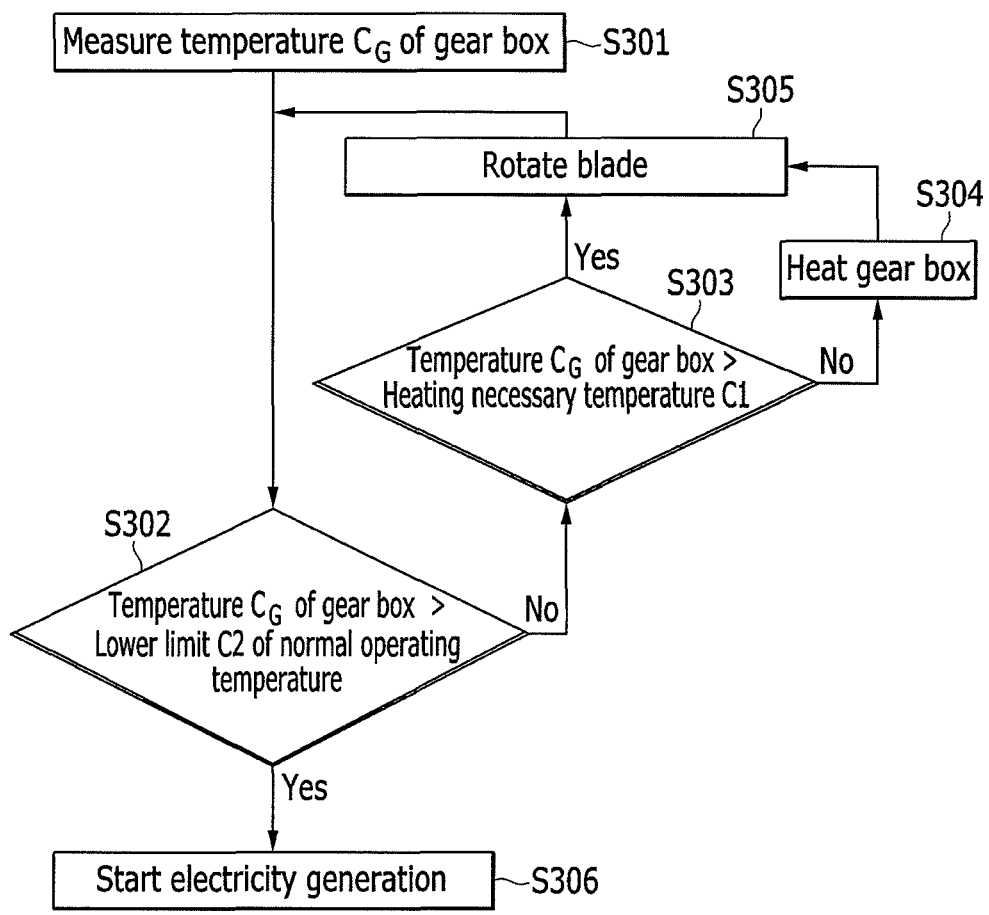
FIG. 3 is a flowchart of the method for controlling a temperature of a gear box for a wind power generator according to the exemplary embodiment of the present invention.
Figure 4:
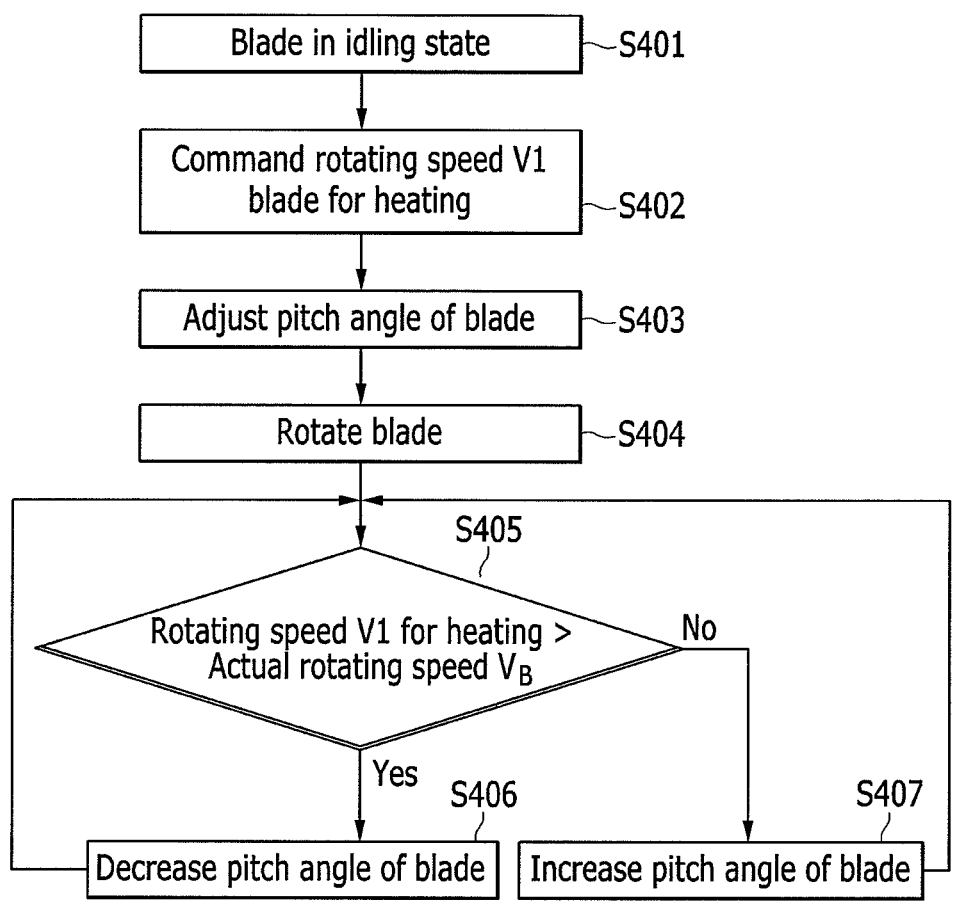
FIG. 4 is a flowchart of a method for adjusting a pitch angle of a blade of a wind power generator according to the exemplary embodiment of the present invention.
Figure 6:
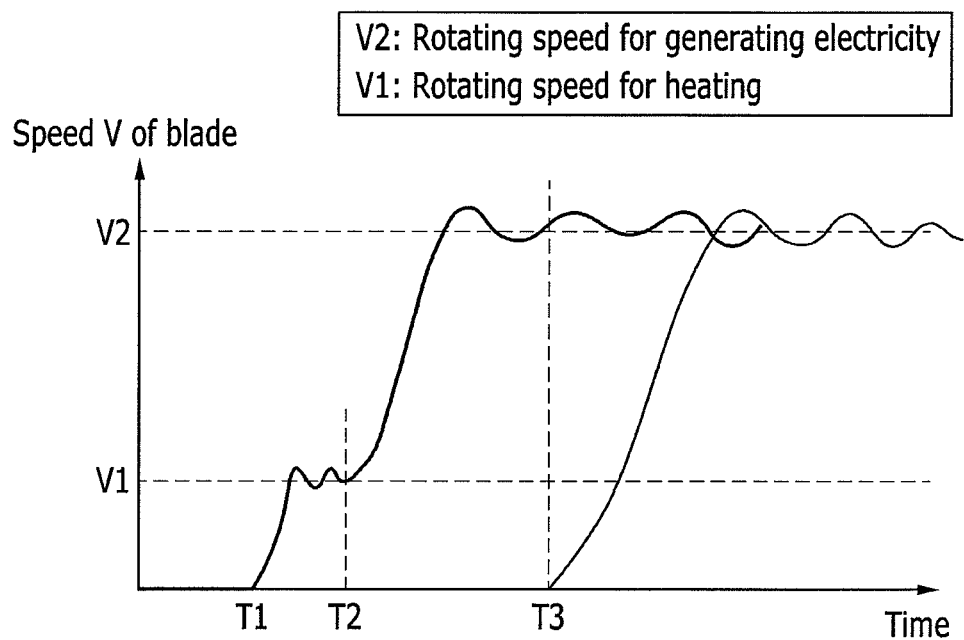
FIG. 6 is a graph illustrating a variation in speed of a blade in a case in which a method for adjusting a temperature of a gear box for a wind power generator according to the exemplary embodiment of the present invention is used.

FIG. 3 is a flowchart for performing a method for controlling a temperature of a gear box for a wind power generator according to the exemplary embodiment of the present invention by using the system 10 for controlling a temperature of a gear box for a wind power generator, which has the aforementioned configuration. FIG. 4 is a flowchart of a process for adjusting the pitch angle of the blade of the wind power generator according to the exemplary embodiment of the present invention. FIG. 5 is a graph illustrating a variation in temperature of the gear box in a case in which a method for adjusting the temperature of the gear box for a wind power generator according to the exemplary embodiment of the present invention is used. FIG. 6 is a graph illustrating a variation in speed of a blade in a case in which a method for adjusting a temperature of a gear box for a wind power generator according to the exemplary embodiment of the present invention is used. In FIGS. 5 and 6, (A) is a graph illustrating a variation in temperature $C_G$ of the gear box in a case in which the temperature in the gear box for a wind power generator is adjusted by using the system for adjusting a temperature of a gear box for a wind power generator according to the exemplary embodiment of the present invention, and (B) is a graph illustrating a variation in temperature of the gear box in a case in which the temperature in the gear box for a wind power generator is adjusted by only using a heater in a system for adjusting a temperature of a gear box in the related art.

The constituent parts (e.g., the pitch adjustment unit 20, the speed sensor 30, the temperature adjustment unit 40, the temperature sensor 50, and the control unit 60) of the system 10 for controlling a temperature according to the exemplary embodiment of the present invention, which have been described above with reference to FIG. 2, may be variously implemented regardless of the names by being subdivided by a functional unit or combined.

Therefore, hereinafter, when describing the method for controlling a temperature of a gear box for a wind power generator according to the exemplary embodiment of the present invention, a subject will be described as a temperature control system 10, and in a case in which a more specific description is needed for better understanding of the present invention, a corresponding constituent part in FIG. 2 will be specifically and explicitly described.

Referring to FIG. 3, in a case in which the blade 3 for a wind power generator is in an idling state, that is, in a stop state, and the pitch angle of the blade 3 is maintained at 90°, electricity generation by a rotation of the blade 3 is not performed.

In this situation, in a case in which electricity generation is to be performed by rotating the blade 3, first, the temperature of the gear box is measured to confirm whether the blade 3 is operated at a rotating speed at which electricity generation may be performed by a rotation of the blade 3. S301

Here, in a case in which the temperature of the gear box 8 is in the range of the normal operating temperature, that is, is higher than the lower limit C2 of the normal operating temperature, and lower than the upper limit C3 of the normal operating temperature, it may be determined that the blade 3 is in a state in which electricity generation may be performed. S302

As such, in a case in which the temperature of the gear box 8 is maintained to the extent that the blade 3 may be rotated to perform electricity generation, the pitch angle of the blade 3 is adjusted, for example, from 90° to 0° to allow the blade 3 to be rotated at a rotating speed at which electricity generation may be performed, thereby allowing electricity generation to be performed. S306

In a case in which the temperature of the gear box 8 is lower than the lower limit C2 of the normal operating temperature, it is necessary to increase the temperature of the gear box 8 so that the temperature of the gear box 8 is higher than the lower limit C2 of the normal operating temperature, and prior to the aforementioned process, a process of determining whether the temperature $C_G$ of the gear box is higher than a heating necessary temperature C1 is performed. S303

Here, in a case in which the temperature $C_G$ of the gear box is lower than the heating necessary temperature C1, the gear box 8 is heated by using the heater. S304

In a case in which the temperature $C_G$ of the gear box is lower than the heating necessary temperature C1, because viscosity of a lubricant inside the gear box 8 is very high, even though the pitch angle of the blade 3 is adjusted so that the blade 3 is autonomously rotated by wind, an engagement state of the gears inside the gear box 8 may hinder a rotation of the blade 3, and in this case, the gears inside the gear box 8 may be damaged or fatigue of the gears may be increased.

In order to solve the aforementioned problem, a forcible heating by the heater may be required up to a minimum temperature which may allow the gears inside the gear box 8 to be rotated, that is, the heating necessary temperature C1.

Here, the heating necessary temperature C1 may be varied in accordance with an influence such as a region where the wind power generator 9 is installed, a season, weather, and the like.

For example, in a case in which an air temperature drops to several tens of degrees below zero in winter, a process of heating the gear box 8 up to the heating necessary temperature C1 is preferentially needed to rotate the blade 3 of the wind power generator 9.

However, even though the wind power generator 9 is installed at the same region, in a case in which the temperature of the gear box is always maintained to be higher than the heating necessary temperature, during a hot season such as summer, separate heating may not be necessary.

As can be seen from FIG. 5, after a predetermined period of time T1 is elapsed, the heated gear box 8 is heated up to the heating necessary temperature C1 of the blade of the wind power generator 9.

Accordingly, when the pitch angle of the blade 3 is adjusted after a period of time T1 for which a temperature is raised up to the heating necessary temperature C1, the wind power generator 9 maintains a state in which the blade 3 may be rotated.

Next, in a case in which the heating of the gear box 8 is completed, and the temperature $C_G$ of the gear box is higher than the heating necessary temperature C1 or it is not necessary to perform the heating, the blade 3 is rotated. S305

According to the exemplary embodiment of the present invention, as the blade 3 is rotated, the temperature of the gear box 8 is raised.

Here, when the blade 3 is rotated, frictional heat is generated between a plurality of gears and a plurality of bearings which are rotated inside the gear box 8, and the frictional heat generated as described above decreases viscosity of a lubricant inside the gear box 8.

As such, as viscosity of a lubricant is decreased, even though the blade of the wind power generator is rotated at a rotating speed for generating electricity, the gear box 8 may maintain a state in which the gears and the bearings are not damaged.

As such, when the temperature of the gear box 8 is raised by rotating the blade 3, a process of measuring the temperature of the gear box 8 is repeated, and then electricity generation begins when the temperature of the gear box 8 is higher than the lower limit of the normal operating temperature.

The method for controlling the temperature of the gear box 8 for a wind power generator according to the exemplary embodiment of the present invention additionally generates frictional heat according to rotations the gears and the bearing inside the gear box 8 through a rotation of the blade 3, thereby more quickly increasing the temperature of the gear box, in comparison with the related art in which the temperature $C_G$ of the gear box 8 is increased only by the heating.

Here, the operation that the blade 3 is rotated in order to increase the temperature $C_G$ of the gear box 8 may be achieved by adjusting the pitch angle of the blade 3 of the wind power generator 9, which is stopped, and by allowing a rotation of the blade 3 to be naturally performed by wind.

Hereinafter, a process of adjusting the pitch angle of the blade 3 will be described with reference to FIG. 4.

Referring to FIG. 4, as described above, in a state in which the blade 3 is not rotated, the blade 3 is in an idling state, and at this time, the pitch angle of the blade 3 is maintained at 90°. S401

Here, in a case in which it is determined that the temperature $C_G$ of the gear box 8 is equal to or higher than the heating necessary temperature C1 at which the gears and the bearings inside the gear box 8 may be operated without being damaged even when the blade 3 is naturally rotated, the control unit 60 commands a rotating speed V1 of the blade 3 for heating the gear box 8. S402

Here, the rotating speed V1 of the blade 3 for heating the gear box 8 may be greater than zero and lower than the rotating speed V2 for generating electricity at which electricity generation is performed by a rotation of the blade 3.

In more detail, the rotating speed V1 of the blade for heating the gear box 8 may be 20 to 30% of the rotating speed V2 for generating electricity.

The reason why the rotating speed V1 for heating has a low speed about 20 to 30% of the rotating speed V2 for generating electricity is that in a state in which viscosity of a lubricant positioned inside of the gear box 8 is so low that torque of the blade 3, which is quickly rotated at the speed V2 for generating electricity, may not be transferred, the blade 3 needs to be rotated at a speed at which the gears positioned inside the gear box 8 may not be damaged.

Accordingly, the rotating speed V1 for heating may be a low speed about 20 to 30% of the rotating speed V2 for generating electricity.

For example, in a case in which the blade 3 is rotated 7 to 8 times per hour for wind power generation, the rotating speed of the blade for heating the gear box 8 may be about 2 to 3 times.

However, the rotating speed V1 of the blade 3 for heating may be differently set according to an external environmental change such as weather or a climate change in a region where the wind power generator 9 is installed, a size of the blade 3 of the wind power generator 9, a type and a characteristic of a lubricant inside the gear box 8, and performance of the gear box itself, but the present invention is not limited thereto.

In addition, the rotating speed V1 for heating may be set in advance in the control unit as values determined by experiments in consideration of the aforementioned requirements.

In addition, because a variation in viscosity of a lubricant in accordance with a variation in temperature of the gear box 8 may affect the rotating speed of the blade 3 of the wind power generator 9, the control unit 60 may control the pitch adjustment unit 20 so as to adjust the pitch angle of the blade 3 corresponding to a variation in temperature of the gear box 8.

When the control unit 60 commands a pitch angle value of the blade 3 to the pitch adjustment unit 20 in order to rotate the blade 3, the pitch adjustment unit 20 adjusts the pitch angle of the blade 3, and therefore the pitch angle is decreased. S403

As such, when the pitch angle is decreased, the blade 3 begins to be rotated by wind. S404

When the blade 3 begins to be rotated, the temperature of the gear box 8 is increased, as can be seen from FIG. 5.

As such, the temperature of the gear box 8, which has been gradually increased, reaches the lower limit C2 of the normal operating temperature of the blade 3 after a predetermined period of time T2 has elapsed.

If the temperature of the gear box 8 is increased only by heating, a period of time T3 is taken to raise the temperature of the gear box 8 up to the normal operating temperature. However, by using the method for controlling the temperature of the gear box 8 according to the exemplary embodiment of the present invention, a period of time T2 is taken to raise the temperature of the gear box 8 up to the lower limit C2 of the normal operating temperature, and as a result, the present invention has an effect of reducing a time by T3−T2.

Here, the method for controlling the temperature of the gear box 8 according to the exemplary embodiment of the present invention may increase the temperature of the gear box by increasing frictional heat due to a rotation of the blade 3 while adjusting the pitch angle of the blade 3 at the same time of heating.

However, in a case in which the gear box 8 is heated only up to the heating necessary temperature by using the heater, and then the temperature $C_G$ of the gear box 8 may be raised to the lower limit C2 of the normal operating temperature only by an operation which adjusts the pitch angle of the blade 3, the heater may not be operated at the same time. Since a separate drive source is needed to operate the heater, the above-mentioned method may reduce power consumption to drive the heater.

Meanwhile, in a case in which an actual rotating speed V of the blade 3 is lower or higher than the rotating speed V1 for heating in a state in which the rotating speed V1 for heating is commanded by the control unit 60, the control unit 60 controls the pitch adjustment unit 20 to control a speed of the blade 3 so that the blade 3 is rotated corresponding to the rotating speed V1 for heating. S405

As described above, a speed control of the blade 3 may be implemented by increasing (S406) or decreasing (S407) the pitch angle of the blade 3 by controlling the pitch adjustment unit 20.

Here, in a case in which the rotating speed V1 for heating is not immediately feedback controlled by the control unit 60 in accordance with the temperature of the gear box 8, but set as a predetermined set value, the pitch angle of the blade 3 may be controlled so that the rotating speed of the blade 3 is converged to the predetermined set value.

Meanwhile, as can be seen from FIG. 6, the blade 3 begins to be rotated after the gear box 8 is initially heated to operate the wind power generator, and then the period of time T1 is elapsed until a temperature satisfies the heating necessary temperature C1, and in a case in which the rotating speed of the blade 3 for heating is set to V1, the blade 3 is configured to be rotated at a speed V1 for the period of time T2, that is, a period of time for which the temperature of the gear box 8 reaches the lower limit C2 of the normal operating temperature.

Further, when the temperature of the gear box 8 exceeds the lower limit C2 of the range of the normal operating temperature, the pitch is adjusted so that the speed of the blade 3 of the wind power generator is increased to the rotating speed V2 for generating electricity, and then electricity generation is performed by using a rotation of the blade 3 after the period of time T2.

Therefore, in comparison with the related art in which when the wind power generator heats the gear box 8 only by the heating, electricity generation is performed by a rotation of the blade of the wind power generator after substantially the period of time T3, by using the method for adjusting a temperature of a gear box for a wind power generator according to the exemplary embodiment of the present invention, electricity generation may be performed after the period of time T2, and accordingly, a time for generating electricity may be increased by T3−T2.

When considering that in an extremely cold region, a heating for about ten hours is needed to heat the gear box by using the heater, by using the method for adjusting a temperature of a gear box according to the exemplary embodiment of the present invention, a period of time for heating the gear box may be remarkably reduced.

Here, a period of time for which the temperature of the gear box reaches the range of normal operating temperature may be varied in accordance with the rotating speed of blade for heating of the wind power generator, and may be set in advance in the control unit after being experimentally measured in advance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

By using the system and the method for controlling a temperature of a gear box for a wind power generator according to the exemplary embodiment of the present invention, a temperature of a gear box for a wind power generator may be raised at a much higher speed.

The invention claimed is:

1. A system for controlling a temperature of a gear box for a wind power generator, in which the gear box connects a blade and a generator of the wind power generator, the system comprising:
a temperature sensor configured to measure a temperature of the gear box;
a temperature adjustment unit configured to adjust the temperature of the gear box in accordance with the temperature of the gear box which is measured by the temperature sensor;
a pitch adjustment unit configured to adjust a pitch angle of the blade; and
a control unit configured to control the pitch adjustment unit so that the blade is rotated at a rotating speed for heating when the measured temperature of the gear box is lower than a range of a normal operating temperature of the gear box,
wherein the rotating speed for heating is a rotating speed of blade which is needed to heat the gear box to the range of the normal operating temperature of the gear box within a predetermined time.

2. The system of claim 1, further comprising:
a speed sensor configured to measure a rotating speed of the blade,
wherein the control unit controls the rotating speed of the blade,
by controlling the pitch adjustment unit so as to decrease the pitch angle of the blade when the rotating speed of the blade is lower than the rotating speed for heating, and
by controlling the pitch adjustment unit so as to increase the pitch angle of the blade when the rotating speed of the blade is higher than the rotating speed for heating.

3. The system of claim 1, wherein
the temperature adjustment unit includes a heater configured to increase the temperature of the gear box when the temperature of the gear box is lower than a heating necessary temperature that is necessary to rotate the blade in a stop state.

4. A method for controlling a temperature of a gear box for a wind power generator, in which the gear box connects a blade and a generator of the wind power generator, the method comprising:
measuring a temperature of the gear box; and
heating the gear box by rotating the blade when the temperature of the gear box is lower than the range of the normal operating temperature of the gear box.

5. The method of claim 4, wherein
in the heating of the gear box,
the blade is rotated by controlling a pitch angle of the blade.

6. The method of claim 5, wherein
in the heating of the gear box,
a rotating speed of the blade for heating the gear box is lower than a rotating speed for generating electricity at which the blade is rotated to produce electricity from the generator.

7. The method of claim 6, wherein
the rotating speed of the blade for heating the gear box is 20 to 30% of the rotating speed for generating electricity.

8. The method of claim 5, wherein
the heating of the gear box includes:
commanding a rotating speed for heating that is a rotating speed which is needed to heat the gear box within a predetermined time;
measuring the rotating speed of the blade; and controlling the rotating speed of the blade by decreasing the pitch angle of the blade when the rotating speed of the blade is lower than the rotating speed for heating, and increasing the pitch angle of the blade when the rotating speed of the blade is higher than the rotating speed for heating.

9. The method of claim 4, further comprising:

before the heating of the gear box, increasing the temperature of the gear box by using a heater connected to the gear box when the temperature of the gear box is lower than a heating necessary temperature that is necessary to rotate the blade that is stopped.

\* \* \* \* \*